(12) United States Patent
Kim et al.

(10) Patent No.: US 7,567,307 B2
(45) Date of Patent: Jul. 28, 2009

(54) HIGHLY EFFICIENT 2D/3D SWITCHABLE DISPLAY DEVICE

(75) Inventors: Dae-sik Kim, Suwon-si (KR); Sergey Chestak, Suwon-si (KR); Kyung-hoon Cha, Yongin-si (KR); Jae-phil Koo, Seoul (KR); Seon-deok Hwang, Yeongi-gun (KR)

(73) Assignee: Samsung Electronics Co., Ltd., Swon-si (KR)

( * ) Notice: Subject to any disclaimer, the term of this patent is extended or adjusted under 35 U.S.C. 154(b) by 181 days.

(21) Appl. No.: 11/780,723

(22) Filed: Jul. 20, 2007

(65) Prior Publication Data

US 2008/0165296 A1    Jul. 10, 2008

(30) Foreign Application Priority Data

Jan. 5, 2007    (KR) .................. 10-2007-0001709

(51) Int. Cl.
*G02F 1/1335* (2006.01)
*G02B 27/26* (2006.01)
*H04N 13/04* (2006.01)

(52) U.S. Cl. .................. 349/15; 359/462; 359/464; 359/465; 348/56; 348/57; 348/E13.004; 348/E13.022

(58) Field of Classification Search .................. 349/15; 359/462, 464, 465; 348/56, 57, E13.002, 348/E13.003, E13.004, E13.022
See application file for complete search history.

(56) References Cited

U.S. PATENT DOCUMENTS

| | | | |
|---|---|---|---|
| 6,040,807 A * | 3/2000 | Hamagishi et al. | 345/6 |
| 2002/0001128 A1 * | 1/2002 | Moseley et al. | 359/465 |
| 2003/0067539 A1 | 4/2003 | Doerfel et al. | |
| 2005/0007513 A1 | 1/2005 | Lee et al. | |
| 2007/0013624 A1 * | 1/2007 | Bourhill | 345/84 |

FOREIGN PATENT DOCUMENTS

| | | |
|---|---|---|
| EP | 0721132 A2 | 7/1996 |
| EP | 0829744 A2 | 3/1998 |
| EP | 0833183 A1 | 4/1998 |
| EP | 1655634 A1 | 5/2006 |

* cited by examiner

*Primary Examiner*—Hemang Sanghavi
(74) *Attorney, Agent, or Firm*—Sughrue Mion, PLLC

(57) ABSTRACT

A 2D/3D switchable display device includes a light source unit; a polarization switching unit for switching light from the light source unit to one of first polarized light and second polarized light, which is perpendicular to the first polarized light; a parallax barrier including slits and barriers that are alternately arranged, wherein the slits transmit incident light and the barriers transmit one of the first and second polarized light and reflect the other of the first and second polarized light; and a display panel for modulating light transmitted through the parallax barrier in response to an image signal to create an image. The 2D/3D switchable display device controls an electric signal applied to the polarization switching unit so that a 2D image and a 3D image are switched to each other.

14 Claims, 9 Drawing Sheets

US 7,567,307 B2

HIGHLY EFFICIENT 2D/3D SWITCHABLE DISPLAY DEVICE

CROSS-REFERENCE TO RELATED PATENT APPLICATION

This application claims the benefit of Korean Patent Application No. 10-2007-0001709, filed on Jan. 5, 2007, in the Korean Intellectual Property Office, the disclosure of which is incorporated herein in its entirety by reference.

BACKGROUND OF THE INVENTION

1. Field of the Invention

The present invention relates to a two-dimensional (2D) /three-dimensional (3D) switchable display device, and more particularly, to a display device, which can reduce the loss of light during a process of switching a 2D display device to a 3D display device.

2. Description of the Related Art

In recent years, 3D display devices have been applied in various fields, such as medical imaging, games, advertisements, education, and military affairs. Also, many studies have been undertaken to display 3D images using holographic and stereoscopic techniques.

The holographic technique is an ideal technique, but a coherent light source is required and it is difficult to record and reproduce a large-sized object located at a long distance.

On the other hand, the stereoscopic technique employs a stereoscopic effect caused by a binocular parallax between two 2-dimensional images that are respectively seen by the two eyes of a user. Since the stereoscopic technique is performed using two planar images, 3D images with high resolution and great depth impression may be displayed in a simple manner. Stereoscopic techniques may be classified into those that use glasses which utilize polarized light and a shutter to allow two eyes to see separate images, and glassesless, autostereoscopic display in which a display device directly separates images to form fields of view. In the case of an autostereoscopic-type display device, the number of viewers is restricted because an observation range is fixed. Nevertheless, the autostereoscopic-type display device is generally preferred to a display device that requires viewers to wear additional glasses. Also, autostereoscopic-type display devices are lately showing a tendency to adopt a parallax barrier that is used to virtually create 3D images using stereo images. The parallax barrier includes vertical or horizontal slits formed in front of images corresponding to the left and right eyes and allows synthetic 3D images to be separately observed through the slits to obtain a stereoscopic effect.

FIG. 1 is a schematic construction diagram of a related art parallax-barrier-type 3D display device.

Referring to FIG. 1, left-eye pixels L for displaying image information for the left eye and right-eye pixels R for displaying image information for the right eye are alternately formed on a liquid crystal (LC) panel 10. A backlight 20 is located under the LC panel 10. The backlight 20 functions to emit light toward the LC panel 10 using electric energy. A parallax barrier 30, which is interposed between the LC panel 10 and an observer 40, allows light to pass therethrough or cuts off the light. Specifically, the parallax barrier 30 includes slits 32 through which light emitted by the right-eye pixel R and the left-eye pixel L pass and barriers 34 which cut off the light, so that the observer 40 can see virtual 3D images. As can be seen from a magnified view of the parallax barrier 30, the slits 32 and the barriers 34 are alternately formed in a vertical direction.

The above-described parallax-barrier-type 3D display device creates 3D images in the following process. Initially, light L2 of light emitted by the backlight 20 becomes light L1 passes through the left-eye pixel L of the LC panel 10 and the slit 32 of the parallax barrier 30 and reaches the left eye of the observer 40. However, although light L2 of light emitted by the backlight 20 passes through the left-eye pixel L of the LC panel 10, since the light L2 travels toward the right eye of the observer 40, the light L2 is cut off by the barrier 34 and cannot reach the observer 40. Likewise, light R1 of light emitted by the backlight 20 passes through the right-eye pixel R of the LC panel 10 and the slit 32 of the parallax barrier 30 and reaches the right eye of the observer 40. However, although light R2 of light emitted by the backlight 20 passes through the right-eye pixel R of the LC panel 10, since the light R2 travels toward the left eye of the observer 40, the light R2 is cut off by the barrier 34 and cannot reach the observer 40. As a result, light that passes through the left-eye pixel L corresponds to the light L1 that is transmitted only to the left eye of the observer 40, while light that passes through the right-eye pixel R corresponds to the light R1 that is transmitted only to the right eye of the observer 40, so that the observer 40 can recognize the light L1 and R1. In this case, sufficient parallax information is provided between the light L1 and the light R1 so that the observer 40, which is a human being, can appreciate 3D images.

A 2D/3D switchable display device has been introduced by putting a 3D display device to practical use in order to relieve fatigue caused by optical illusions between both eyes. The 2D/3D switchable display device may be embodied by forming the parallax barrier 30 of FIG. 1 using liquid crystals (LCs). Specifically, when power is supplied to the LCs, some pixels function as the barriers 34 that cut off/absorb light emitted by the backlight 20, and the other pixels to which no power is supplied function as the slits 32 of the parallax barrier 30 to create 3D images. Also, when no power is supplied to the LCs, the parallax barrier 30 is not formed so that the same image is transmitted to the right and left eyes of the observer 40 to display 2D images.

When 3D images are displayed, a lot of light is cut off and absorbed by the barriers 34, thus lowering optical efficiency. Owing to low optical efficiency, it is difficult to minimize the size of the slits 32 to lessen crosstalk in a 3D mode. Also, as the number of viewpoints increase, the portion of pixels that are screened by barriers increases. Accordingly, optical efficiency further deteriorates, thus precluding the use of the parallax-barrier-type 3D display device in a multi-mode.

FIG. 2 is a construction diagram of a related art parallax-barrier-type 3D display device in which a reflection layer is formed on barriers, which is proposed in order to improve optical efficiency.

Referring to FIG. 2, an aluminum coating layer 66 is formed on barriers 63 in which light emitted by a backlight 60 is absorbed, so that light is sent back to a reflection plate 69 and recycled. The structure shown in FIG. 2 may be applied to a 3D display device, but not to a 2D/3D switchable display device.

SUMMARY OF THE INVENTION

The present invention provides a highly efficient 2D/3D switchable display device, which may improve optical efficiency, optimize the dimension of slits in a parallax barrier, and be effectively used in a multi-viewpoint manner.

According to an aspect of the present invention, there is provided a highly efficient 2D/3D switchable display device. The device includes a light source unit; a polarization switching unit for switching light from the light source unit to one of first polarized light and second polarized light, which is perpendicular to the first polarized light; a parallax barrier including slits and barriers that are alternately arranged, wherein the slits transmit incident light and the barriers transmit one of the first and second polarized light and reflect the other of the first and second polarized light; and a display panel for modulating light transmitted through the parallax barrier in response to an image signal to create an image. The 2D/3D switchable display device controls an electric signal applied to the polarization switching unit so that a 2D image and a 3D image are switched to each other.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE EXEMPLARY EMBODIMENTS OF THE INVENTION

Figure 1:
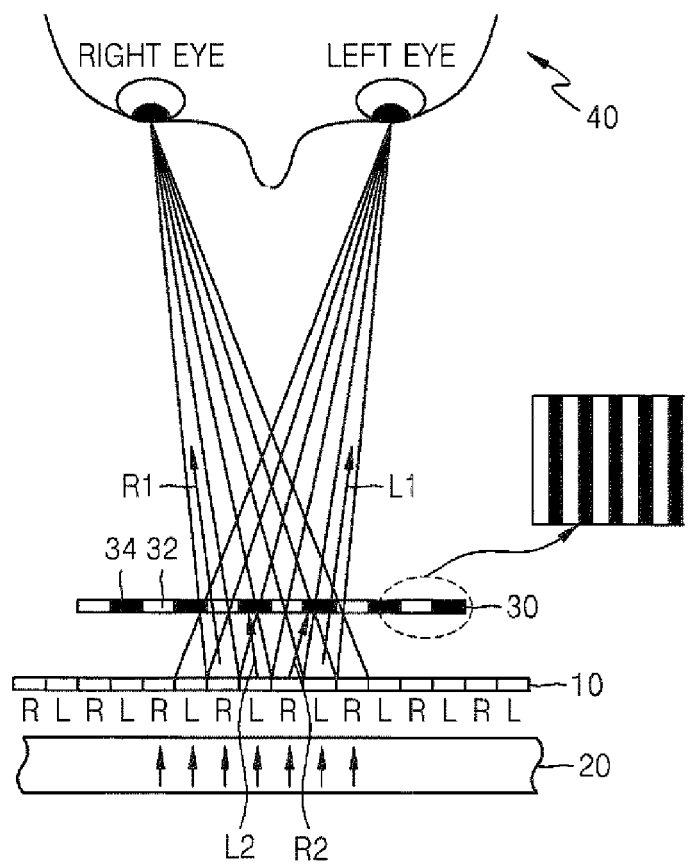
FIG. 1 is a schematic construction diagram of a related art parallax-barrier-type 3D display device.
Figure 2:
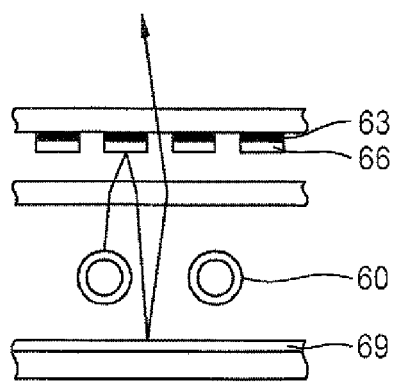
FIG. 2 is a construction diagram of a related art parallax-barrier-type 3D display device in which a reflection layer is formed on barriers.

A 2D/3D switchable display device according to the present invention will now be described more fully hereinafter with reference to the accompanying drawings, in which exemplary embodiments of the invention are shown. This invention may, however, be embodied in different forms and should not be construed as limited to the embodiments set forth herein. Rather, these embodiments are provided so that this disclosure is thorough and complete and fully conveys the scope of the invention to those skilled in the art. In the drawings, the thicknesses of layers and regions are exaggerated for clarity. The same reference numerals are used to denote the same elements throughout the specification.

Figure 3:
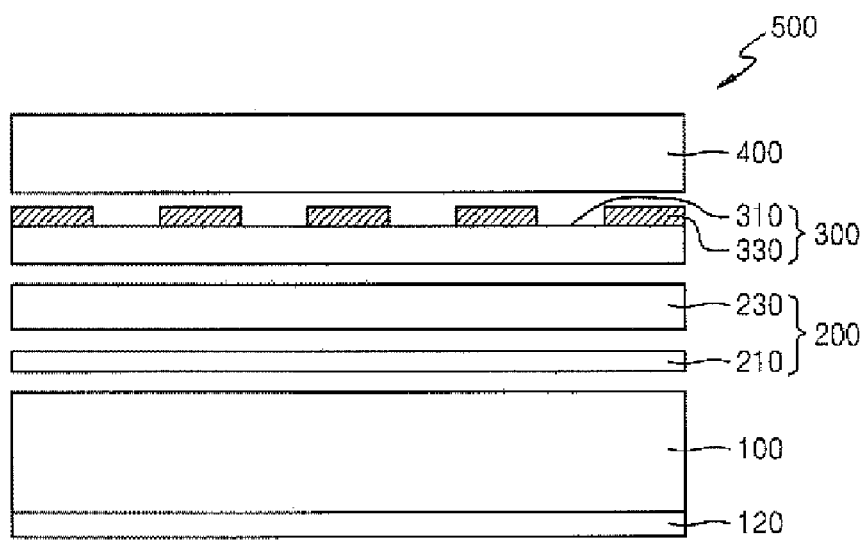
FIG. 3 is a schematic construction diagram of a 2D/3D switchable display device according to an exemplary embodiment of the present invention.

FIG. 3 is a schematic construction diagram of a 2D/3D switchable display device 500 according to an exemplary embodiment of the present invention.

Referring to FIG. 3, the 2D/3D switchable display device 500 includes a light source unit 100, a polarization switching unit 200, a parallax barrier 300, and a display panel 400. The polarization switching unit 200 switches light from the light source unit 100 to first polarized light or second polarized light, which is perpendicular to the first polarized light, in response to an electric signal. The parallax barrier 300 includes slits 310 and barriers 330 that are alternately arranged. Also, the display panel 400 modulates light transmitted through the parallax barrier 300 in response to an image signal and creates an image.

The light source unit 100 may include a reflection plate 120 for recycling light reflected by the barriers 330. The light source unit 100 typically emits unpolarized light, and the polarization switching unit 200 switches the unpolarized light emitted by the light source unit 100 to predetermined linearly polarized light in response to the electric signal and emits the linearly polarized light. To perform these functions, the polarization switching unit 200 includes a polarizer 210 and a phase delayer 230. The polarizer 210 transmits predetermined linearly polarized light of incident light, and the phase delayer 230 switches the polarized light transmitted through the polarizer 210 into another polarized light, which is perpendicular to the polarized light transmitted through the polarizer 210, in response to an electric signal. For example, the polarizer 210 may be a reflective polarizer, which allows the first polarized light to pass therethrough and reflects the second polarized light that is perpendicular to the first polarized light. The reflective polarizer may be a dual brightness enhancement film (DBEF). The phase delayer 230 delays the phase of incident light and switches the incident light to polarized light. For example, the phase delayer 230 allows incident light to directly pass therethrough without a delay in phase when there is no electric signal. Also, the phase delayer 230 delays the phase of incident light by as much as $+\lambda/2$ or $-\lambda/2$ and switches the incident light to polarized light that is perpendicular to the incident light.

Figure 4A:
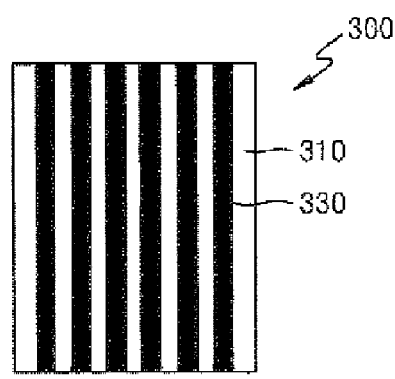
FIGS. 4A through 4D are diagrams illustrating exemplary arrangements of slits and barriers in parallax barriers.
Figure 4B:
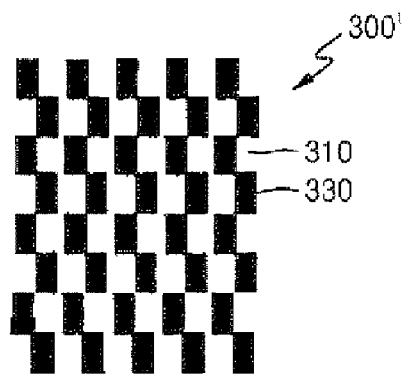
Figure 4C:
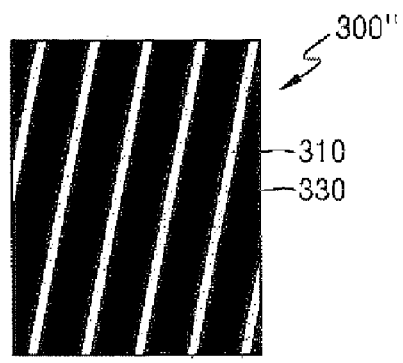
Figure 4D:
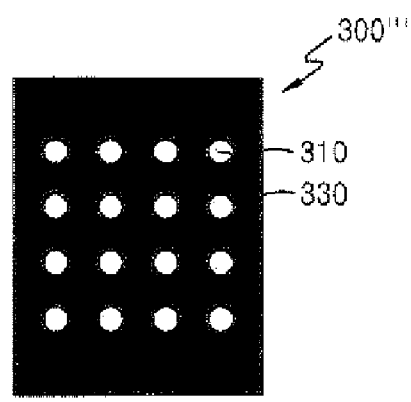
Figure 5:
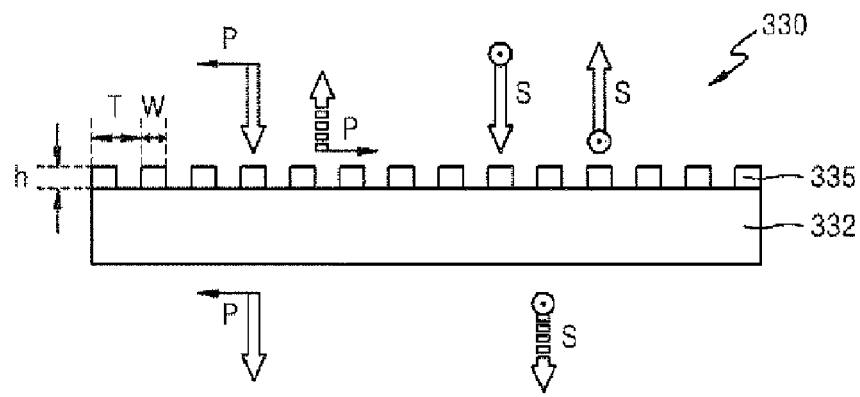
FIG. 5 is a diagram of a wire grid polarizer that is used as a barrier for a parallax barrier shown in FIG. 3.

The parallax barrier 300 includes the slits 310 and the barriers 330 that are alternately arranged. The slits 310 allow light to pass therethrough, while the barriers 330 cut off the light. The parallax barrier 300 creates 3D images due to binocular parallax. The arrangements of the slits 310 and the barriers 330 are exemplarily illustrated in FIGS. 4A through 4D. In FIG. 4A, the slits 310 and the barriers 330 are arranged in stripes. In FIG. 4B, the slits 310 and the barriers 330 are arranged zigzag. In FIG. 4C, the slits 310 and the barriers are arranged in slanted stripes. Also, in FIG. 4D, the slits 310 are arranged as pinhole types in the barrier 330. In the exemplary embodiment of the present invention, all of light incident on the barriers 330 is not cut off, and only predetermined linearly polarized light is cut off. Also, the cut-off light is not absorbed in the barriers 330 but reflected by the barriers 330 for recycling use. To attain the feature of the present invention, the barrier 330 may be a reflective polarizer. For example, the barrier 330 may be a wire grid polarizer of FIG. 5, which will be described later. Also, the slit 310 may be constructed to allow light to pass therethrough. As illustrated in FIG. 5, the barriers 330 are formed on a transparent member, and portions of the transparent member, which are not covered with the barriers 330, correspond to the slits 310. Alternatively, the slits 310 may be openings.

The display panel 400 modulates light transmitted through the parallax barrier 300 in response to an image signal and creates an image. The display panel 400 may be a liquid crystal display (LCD) panel.

Hereinafter, the functions of the above-described 2D/3D display device 500 will be described.

At the outset, the construction and function of a wire grid polarizer used as the barrier 330 will be described.

FIG. 5 is a diagram of a wire grid polarizer that is used as the barrier 330 for the parallax barrier 300 shown in FIG. 3.

Referring to FIG. 5, the barrier 330 may be a wire grid polarizer, which includes a transparent substrate 332 and a plurality of metal wires 335 arranged at regular intervals on the transparent substrate 332. The wire grid polarizer makes use of the material and arrangement of the metal wires 335 so that the wire grid polarizer can reflect first polarized light S of incident light, which is polarized in a lengthwise direction of the metal wires 335, and transmit second polarized light P of the incident light, which is polarized in a widthwise direction of the metal wires 335. To enable this function, the metal wires 335 may be formed of a metal having high reflectivity, for example, aluminum (Al), gold (Au), or silver (Ag). Detailed measurements of the wire grid polarizer, for example, an interval "T" between the metal wires 335 and the height "h" and width "w" of the metal wire 335, may be appropriately designed in consideration of the material of the metal wire 335 and the wavelength λ of incident light. For instance, the height "h" of the metal wire 335 should be sufficiently great so that the metal wire 335 can reflect light that is polarized in a lengthwise direction of the metal wire 335, while the width "w" of the metal wire 335 should be sufficiently smaller than the wavelength λ of light incident on the wire grid polarizer. Also, because when the interval T between the metal wires 335 is greater than λ/2, the wire grid polarizer may function as diffraction grating, the interval T may be less than λ/2.

The principle on which the barrier 330, which is the wire grid polarizer, reflects the first polarized light S of incident light, which is polarized in a lengthwise direction of the metal wires 335, and transmits the second polarized light P of the incident light, which is polarized perpendicularly to the first polarized light S, will now be described. The wire grid polarizer controls polarization using the influence of polarized light on free electrons of a metal that forms the metal wire 335. When the first polarized light S which is polarized in a lengthwise direction of the metal wires 335 is incident on the metal wires 335, free electrons in the metal wire 335 oscillate in the lengthwise direction of the metal wire 335, and the resultant electromagnetic waves counterbalance the first polarized light S, so that the first polarized light S is mostly reflected by the metal wire 335. In other words, the metal wires 335 show high reflection metal characteristics with respect to the first polarized light S. Of course, even if the metal wire 335 is formed of a reflective metal, a small part of the first polarized light S may be absorbed in the metal wire 335. Also, when the metal wire 335 has a small thickness, some of the first polarized light S may be transmitted through the metal wire 335 as illustrated with a dotted arrow. Therefore, the metal wire 335 has a reflection rate of about 90 to 95%. Meanwhile, when the second polarized light P is incident on the metal wire 335 in a widthwise direction of the metal wire 335, the widthwise oscillation of free electrons of the metal wire 335 is spatially restricted and the counterbalance of electromagnetic waves hardly occur, so that the second polarized light P is mostly transmitted through the metal wire 335. Of course, even if the metal wire 335 is transparent like glass, some of the second polarized light P may be reflected due to surface reflection as illustrated with a dotted arrow.

The performance of the wire grid polarizer may be represented using a polarization extinction ratio and a transmission ratio. The polarization extinction ratio may be defined as (Si/St)|Pi=0, and the transmission ratio may be defined as (Pt/Pi)|Si=0. That is, the polarization extinction ratio corresponds to an optical power ratio of incident first polarized light Si to the transmitted first polarized light St when the first polarized light S is incident on the metal wire 335, and the transmission ratio corresponds to an optical power ratio of transmitted second polarized light Pt to the incident second polarized light Pi when the second polarized light P is incident on the metal wire 335.

Figure 6:
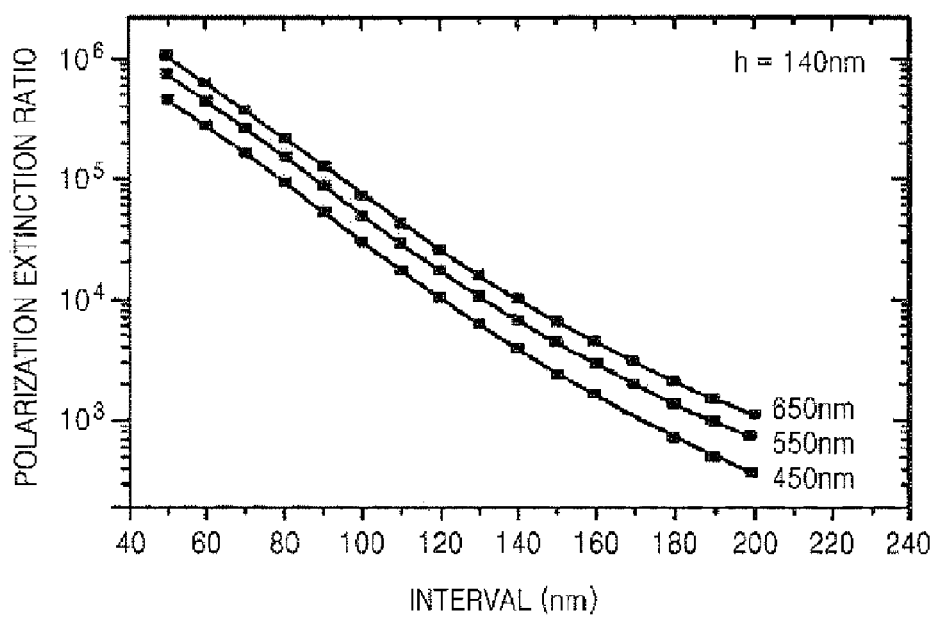
FIG. 6 is a graph showing a polarization extinction ratio of a wire grid polarizer.

FIG. 6 is a graph showing a polarization extinction ratio of the wire grid polarizer. When the metal wire 335 is formed of Al and has a height of 140 nm. In FIG. 6, a polarization extinction ratio versus an interval T between the metal wires 335 is shown with respect to the wavelength λ of incident light.

Referring to FIG. 6, as the interval T increases, the polarization extinction ratio decreases. This feature may depend on the material and height "h" of the metal wire 335. Detailed measurements of the wire grid polarizer may be controlled in consideration of the relation between the polarization extinction ratio and the interval T.

Figure 7A:
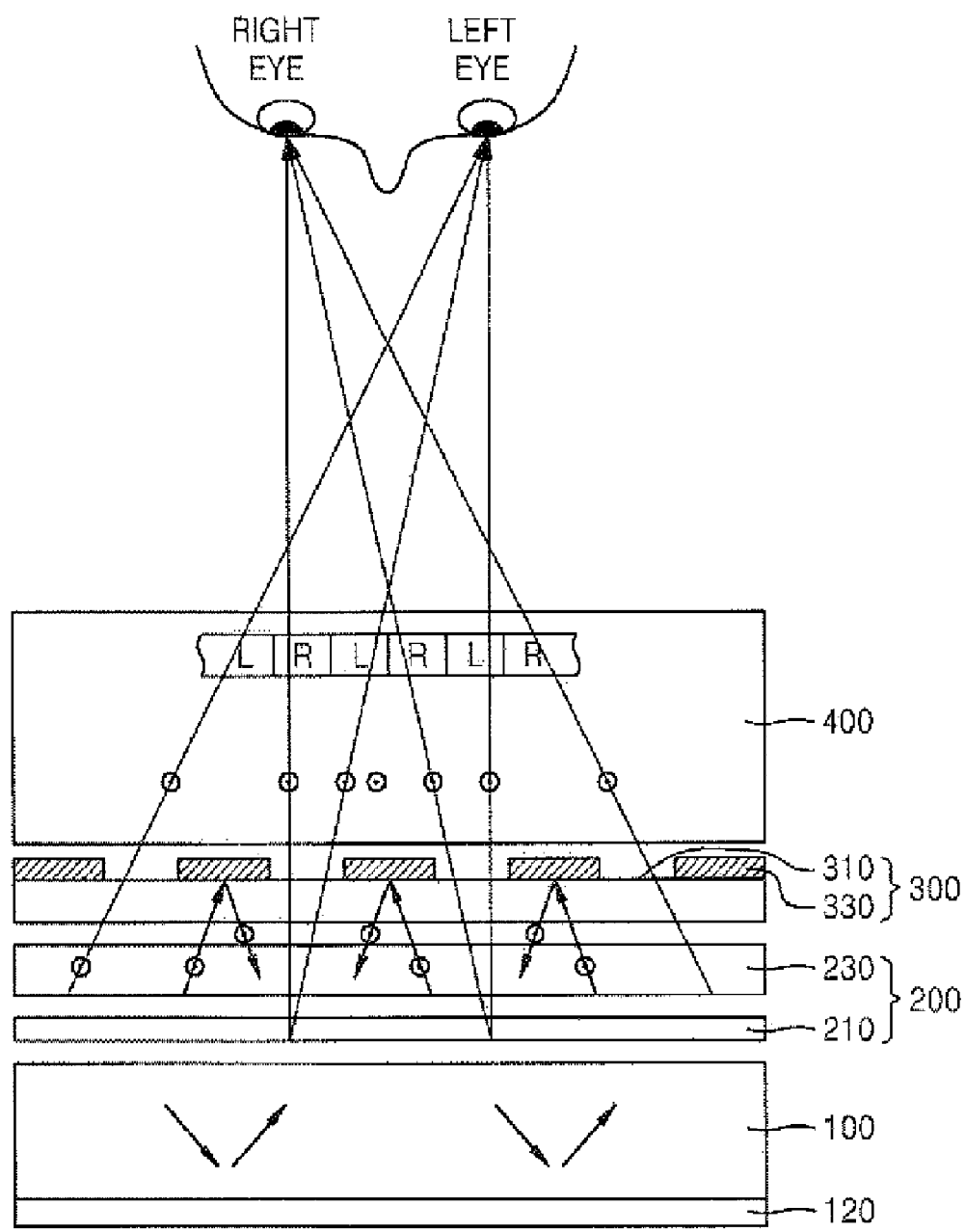
FIGS. 7A and 7B are diagrams of a light transmission path when the 2D/3D switchable display device of FIG. 3 operates in 3D and 2D modes, respectively.
Figure 7B:
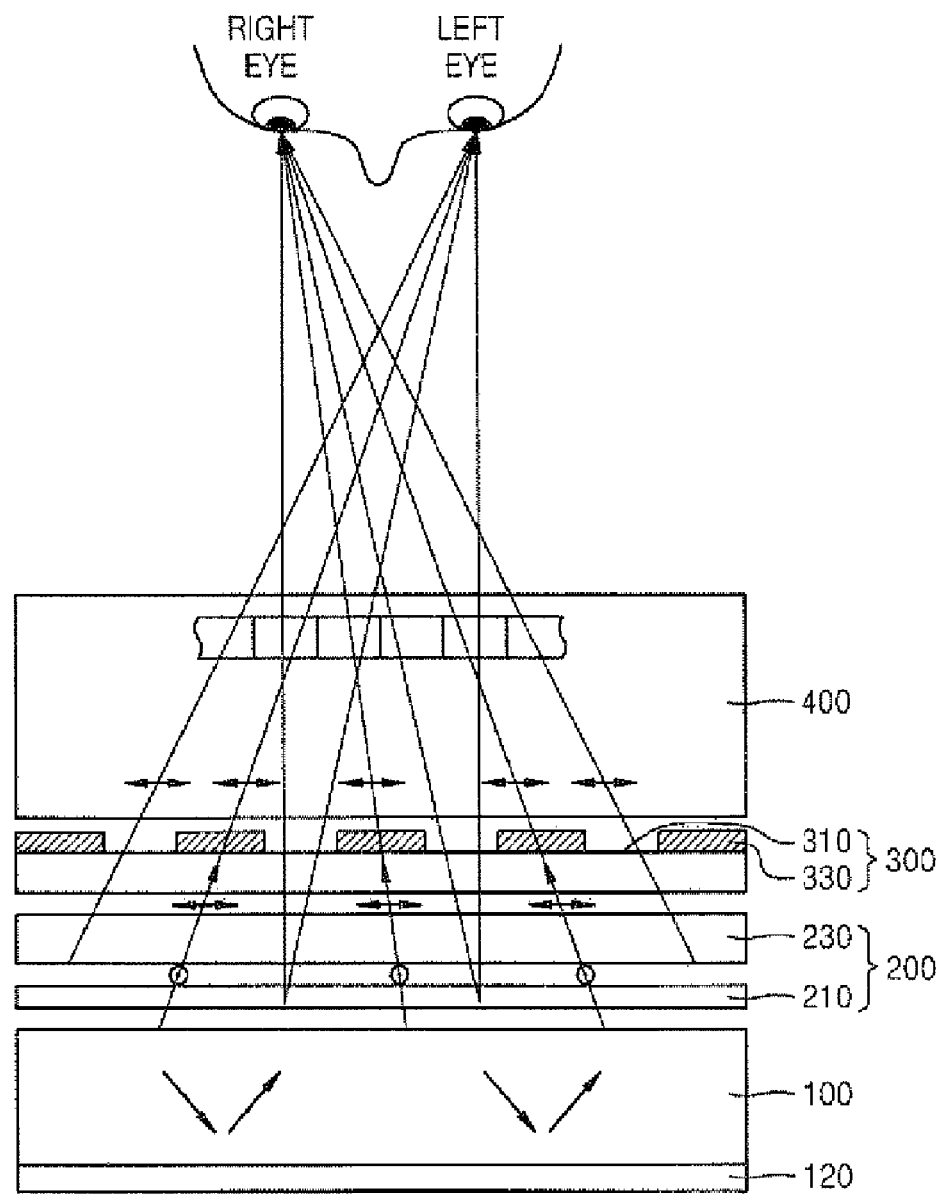

FIGS. 7A and 7B are diagrams of a light transmission path when the 2D/3D switchable display device of FIG. 3 operates in 3D and 2D modes, respectively.

Referring to FIG. 7A, only predetermined linearly polarized light of unpolarized light that is incident from the light source unit 100 toward the polarizer 210 is transmitted through the polarizer 210. For example, only first polarized light S is transmitted through the polarizer 210 and travels toward the phase delayer 230. In the 3D mode, the phase delayer 230 is turned off not to delay the phase of incident light. Thus, the first polarized light S incident on the phase delayer 230, which keeps the polarization state, passes through the phase delayer 230 and is incident on the parallax barrier 300. Light that travels toward the slit 310 of the parallax barrier 300 is transmitted through the slit 310. Light that travels toward the barrier 330 is reflected by the barrier 330 that is the wide grid polarizer for reflecting the first polarized light S. Left-eye pixels L and right-eye pixels R are alternately arranged on the display panel 400. Since the slits 310 are separated from one another by the barrier 330, the light transmitted through the slit 310 is separated into light traveling toward the left-eye pixel L and light traveling toward the right-eye pixel R and light incident on the left and right eyes, respectively. Thus, different images are transmitted to the left and right eyes so that an observer recognizes a 3D image. Meanwhile, the light reflected by the barrier 330 travels toward the light source unit 100 and is reflected by the reflection plate 120 and recycled.

Referring to FIG. 7B, the phase delayer 230 is turned on and controlled to delay the phase of incident light by as much as λ/2. Thus, the first polarized light S that is transmitted through the polarizer 210 is changed to second polarized light, which is perpendicular to the first polarized light S, by the phase delayer 230. Since the barrier 330 is the wide grid polarizer that reflects the first polarized light S, but transmits the second polarized light P, both light traveling toward the slit 310 and light traveling toward the barrier 330 are transmitted through the parallax barrier 300. In this case, the same image is transmitted to the left and right eyes so that the observer recognizes a 2D image.

Polarized light incident on the display panel 400 in the 3D mode is perpendicular to polarized light incident on the display panel 400 in the 2D mode. Thus, the display panel 400 modulates light transmitted in the 3D mode based on a normally white (NW) mode to process an image signal, while the display panel 400 modulates light transmitted in the 2D mode based on a normally black (NB) mode to process an image signal.

Although it is exemplarily described that the polarizer 210 allows the first polarized light S to pass therethrough and the phase delayer 230 is turned off in the 3D mode and turned on in the 2D mode, the present invention is not limited thereto. For example, the polarizer 210 may allow the second polarized light P to pass therethrough and the phase delayer 230 may be turned on in the 3D mode and turned off in the 2D mode.

Figure 8:
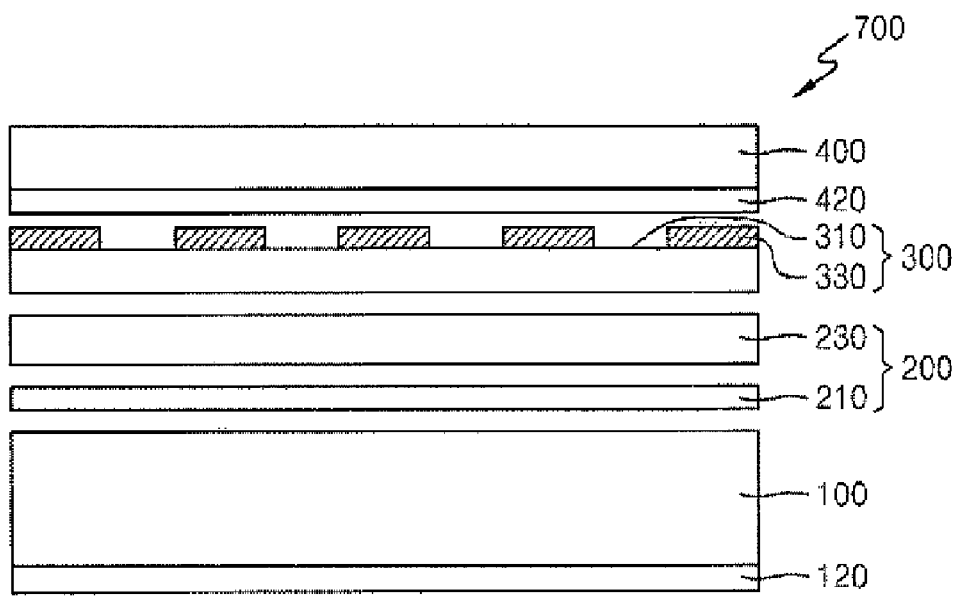
FIG. 8 is a schematic construction diagram of a 2D/3D switchable display device according to another exemplary embodiment of the present invention.

FIG. 8 is a schematic construction diagram of a 2D/3D switchable display device 700 according to another exemplary embodiment of the present invention. The 2D/3D switchable display device 700 of the current exemplary embodiment is different from the 2D/3D switchable display device 500 in that a polarization switch 420 is further installed between a display panel 400 and a parallax barrier 300.

Referring to FIG. 8, the 2D/3D switchable display device 700 includes a light source unit 100, a polarization switching unit 200, a parallax barrier 300, and a display panel 400. The polarization switching unit 200 switches light from the light source unit 100 to first polarized light or second polarized light, which is perpendicular to the first polarized light, in response to an electric signal. The parallax barrier 300 includes slits 310 and barriers 330 that are alternately arranged. Also, the display panel 400 modulates light transmitted through the parallax barrier 300 in response to an image signal and creates an image.

The light source unit 100 may include a reflection plate 120. The arrangements of the slits 310 and the barriers 330 are exemplarily illustrated in FIGS. 4A through 4D. Also, the barrier 330 may be a wide grid polarizer as shown in FIG. 5. The polarization switching unit 200 includes a polarizer 210 and a phase delayer 230, which delays the phase of incident light in response to the electric signal. Further, the polarization switch 420 is prepared between the parallax barrier 300 and the display panel 400. The polarization switch 420 switches the polarization of incident light so that the same polarized light is incident on the display panel 400 in either of 3D and 2D modes. The polarization switch 420 may be the same as the phase delayer 230 that delays the phase of incident light in response to the electric signal.

Figure 9A:
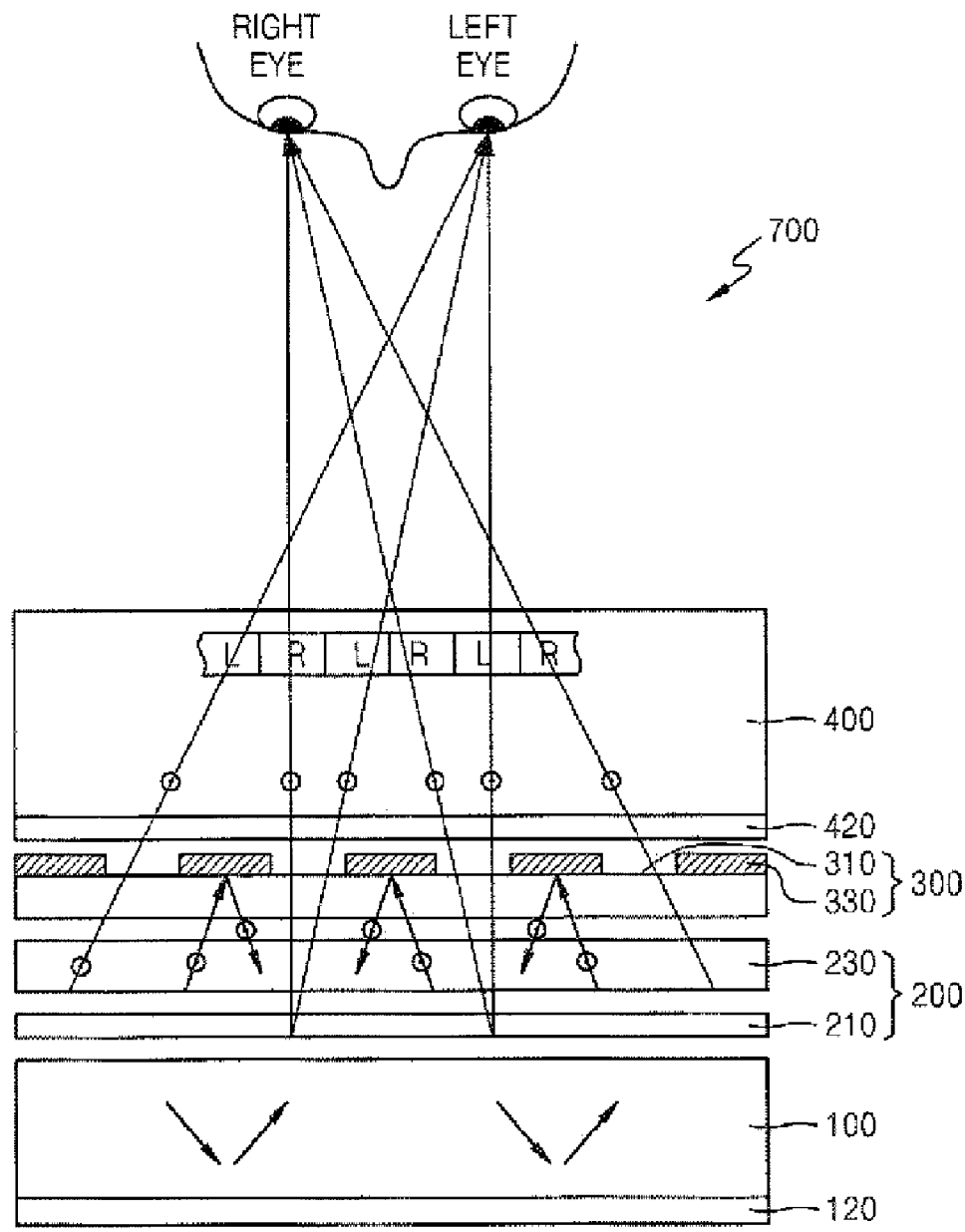
FIGS. 9A and 9B are diagrams of a light transmission path when the 2D/3D switchable display device of FIG. 8 operates in 3D and 2D modes, respectively.
Figure 9B:
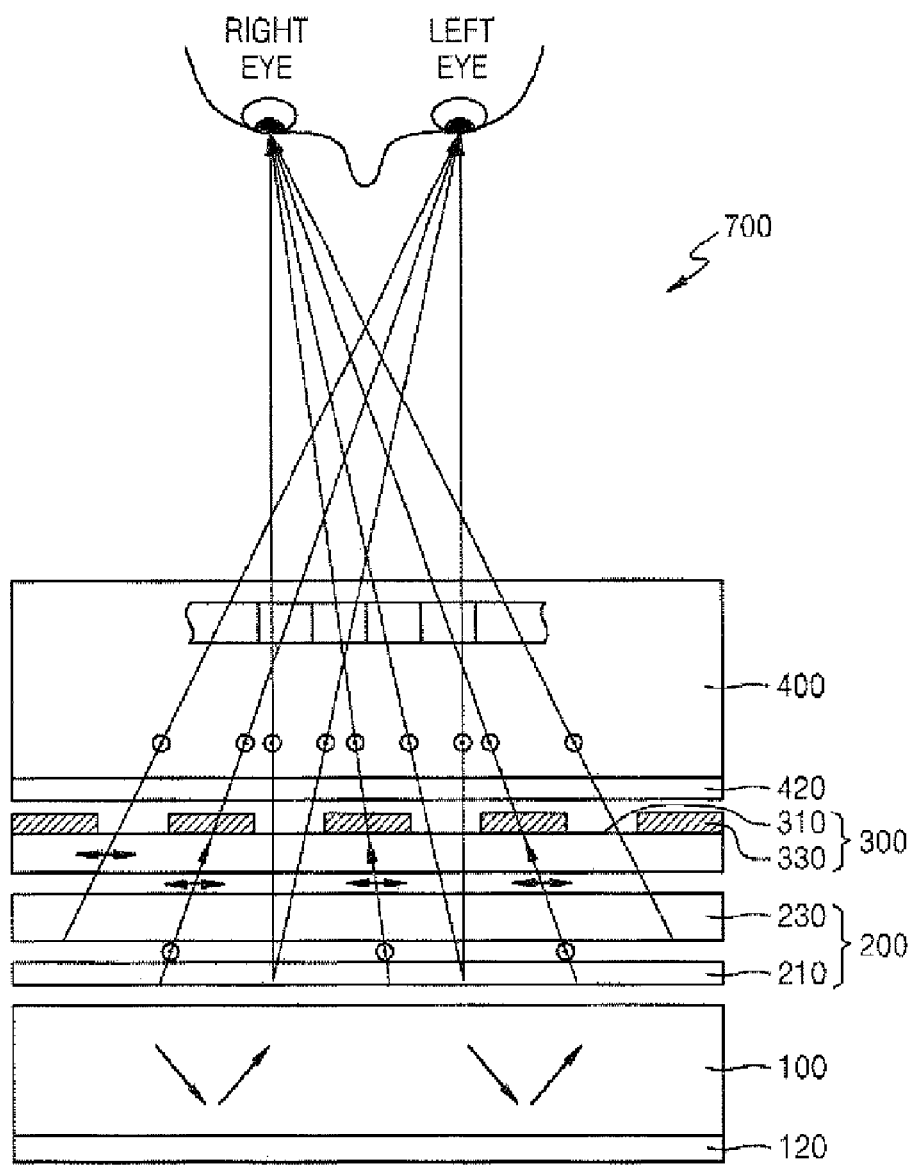

FIGS. 9A and 9B are diagrams of a light transmission path when the parallax-barrier-type 3D display device 700 of FIG. 8 operates in 3D and 2D modes, respectively. Here, the same description as presented with reference to FIGS. 7A and 7B will be omitted for brevity.

Referring to FIG. 9A, which illustrates the 3D mode, the polarization switch 420 is controlled not to switch the polarization of incident light so that the first polarized light is incident on the display panel 400. Referring to FIG. 9B, which illustrates the 2D mode, the polarization switch 420 is controlled to switch the polarization of incident light. Therefore, the second polarized light, which is transmitted through the parallax barrier 300, is changed to the first polarized light, and the first polarized light is incident on the display panel 400 like in the 3D mode. Here, although it is described that polarized light incident on the display panel 400 is the first polarized light, the polarization switch 420 may operate in the 3D mode and may not operate in the 2D mode so that the second polarized light may be incident on the display panel 400. The display panel 400 modulates the incident polarized light based on an NW or NB mode to process an image signal.

According to the present invention as described above, in the 2D/3D switchable display device, a barrier of a parallax barrier allows a predetermined polarized light to pass therethrough and the remaining polarized light to be reflected. Thus, when a 2D mode is switched to a 3D mode, a drop in optical efficiency can be minimized. As a result, the 2D/3D switchable display device of the present invention can minimize the size of slits of the parallax barrier to lessen crosstalk and can be easily applied in a multi-viewpoint manner.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A switchable display device comprising:
    a light source unit;
    a polarization switching unit which switches light from the light source unit to one of first polarized light and second polarized light, which is perpendicular to the first polarized light;
    a parallax barrier comprising slits and barriers that are alternately arranged, wherein the slits transmit incident light and the barriers transmit one of the first polarized light and the second polarized light and reflect the other of the first polarized light and the second polarized light; and
    a display panel which modulates light transmitted through the parallax barrier in response to an image signal to create an image,
    wherein the switchable display device controls an electric signal applied to the polarization switching unit so that a two-dimensional (2D) image and a three-dimensional (3D) image are switched to each other.

2. The display device of claim 1, wherein the light source unit comprises a reflection plate, and the light reflected by the barriers is recycled by the reflection plate.

3. The display device of claim 1, wherein the polarization switching unit comprises:
    a polarizer which transmits one of the first polarized light and the second polarized light; and
    a phase delayer which delays a phase of the light transmitted through the polarizer in response to the electric signal.

4. The display device of claim 3, wherein the phase delayer delays a phase of incident light having a wavelength of λ by one of 0, +λ/2, and −λ/2 in response to the electric signal.

5. The display device of claim 3, wherein the polarizer is a reflective polarizer that transmits one of the first polarized light and the second polarized light and reflects the other of the first polarized light and the second polarized light.

6. The display device of claim 5, wherein the polarizer is a dual brightness enhancement film.

7. The display device of claim 1, wherein the barrier is a reflective polarizer.

8. The display device of claim 1, wherein the display panel modulates 3D polarized light emitted in a 3D mode based on a normally white mode and modulates 2D polarized light emitted in a 2D mode based on a normally black mode to process the image signal.

9. The display device of claim 1, further comprising a polarization switch interposed between the parallax barrier and the display panel, wherein the polarization switch switches polarization of the incident light so that the polarized light is incident on the display panel in one of a 3D mode and a 2D mode.

10. The display device of claim 1, wherein the barriers are a wide grid polarizers.

11. The display device of claim 10, wherein the slits have a same dimension as the barriers or are smaller than the barriers.

12. The display device of claim 11, wherein the slits and barriers of the parallax barrier are arranged in stripes.

13. The display device of claim 11, wherein the slits and barriers of the parallax barrier are arranged in a zigzag pattern.

14. The display device of claim 11, wherein the parallax barrier includes the barriers in which the slits are arranged as pinhole types.

* * * * *